May 30, 1967

A. WEISBERG 3,321,832

DENTAL ARTICULATOR ANALOGS AND METHOD AND
APPARATUS FOR CONSTRUCTING SAME

Filed Aug. 26, 1963

INVENTOR.
ALEX WEISBERG
BY Zulwider, Patton, Rieber,
Lee, and Utecht
Attorneys May 30, 1967 A. WEISBERG 3,321,832
DENTAL ARTICULATOR ANALOGS AND METHOD AND
APPARATUS FOR CONSTRUCTING SAME
Filed Aug. 26, 1963 4 Sheets-Sheet 2

INVENTOR.
ALEX WEISBERG
BY Fulwider, Patton, Rieber
Lee, and Utecht
Attorneys

INVENTOR.
ALEX WEISBERG
BY Zulwider, Patton, Rieben,
Lee, and Utecht
Attorneys

United States Patent Office 3,321,832
Patented May 30, 1967

3,321,832
DENTAL ARTICULATOR ANALOGS AND METHOD AND APPARATUS FOR CONSTRUCTING SAME
Alex Weisberg, Beverly Hills, Calif., assignor to The Dentists' Supply Company of New York, York, Pa., a corporation of New York
Filed Aug. 26, 1963, Ser. No. 304,427
20 Claims. (Cl. 32—32)

The present invention relates to improved dental articulator analogs and to a method and apparatus for making them by which they are customized to the individual patient and provide accurate duplication of the motions of the patient's temporomandibular joints.

In producing the customized analogs, recordings in the form of three-dimensional pantographs of the actual relative movements of the patient's jaws are cut by power tools in hard material and from these recordings or pantographs transfer is made, again by power tool cutting of hard material, to permanent, customized analogs in the form of downwardly directed sockets which receive articulator pins to reproduce in the articulator the engagement of the patient's teeth provided by movement of his actual mandibular joints. The customized analogs give a closer approximation to the action of the patient's own mandibular joints than do the mechanically adjustable joints usually provided with universal articulators. Once the analogs of the temporomandibular joints have been constructed, they may be preserved and their use at a future time is relatively simple and requires a minimum of measurement and setting up for simulating the joint motion in the articulator.

The analog sockets are desirably cut into relatively hard material, for which a plastic such as Bakelite is a suitable example, so that they will resist wear and damage and may easily be preserved to give accurate reproductions of the pivotal and lateral shifting movements of the particular patient's temporomandibular joints when the analogs are disposed in an articulator over upstanding pins therein. The recordings or pantographs, while they may be impressed into soft material, are preferably also cut by power tools in relatively hard plates of plastic, such as Bakelite or other material, to give relatively rigid three-dimensional pantographs which will more readily serve as guides for the translation of the recorded shapes into the temporomandibular analog sockets. In each case the plastic or other hard material is desirably cut by high-speed rotating routers or cutters.

In the cutting of the analog sockets, guide slots representing border limits of the lateral shifting movements of the joints are first cut in accordance with the movements of tracers followings the outside outlines only of the recordings or pantographs cut by the actual relative movements of the patient's jaws. These guide slots cooperate with the cutters for the analog sockets to limit the lateral cutting movements of the cutters while the cutting of the end surfaces of the sockets is governed by the conformation of the bottom surfaces of the original recordings.

The analogs of the patient's temporomandibular joints are cut at the proper intercondylar distance, which distance may be recorded or physically maintained to facilitate future mounting of the analogs. For example, the analogs may be relatively permanently secured to a crossbar on which the fore arm of the articulator is detachedly secured. Alternately, the analogs may be coded or indexed for attachment to the same or identical crossbars.

An object of the present invention is to provide an improved, customized analog for reproducing the action of a dental patient's temporomandibular joint.

Another object of this invention is to provide a permanent analog customized for an individual dental patient which may be readily and simply mounted on a dental articulator to reproduce the motion of the patient's mandibular joint.

Another object of this invention is an improved method of forming an accurate analog of a dental patient's mandibular joint.

A further object of this invention is an improved method of forming accurate analogs of a dental patient's mandibular joints by cutting three dimensional pantographs of the relative movements of the patient's jaws and translating the pantograph shapes into analog sockets which cooperate with articulator pins to reproduce the action of the patients' mandibular joints.

A still further object of this invention is an improved method of translating recordings of the relative movements of a dental patient's jaws to analogs including the intermediate step of forming guide elements for the border limits of lateral motion from the outlines of the recordings and utilizing the guide elements in forming the lateral walls of the analogs.

Yet another object of the invention is the provision of improved apparatus for forming permanent, customized articular analogs of a dental patient's temporomandibular joints.

These and other objects and features of the invention will be apparent to those skilled in the art from the following specification and the appended drawings, in which.

Figures 1, 2, 3, 4:
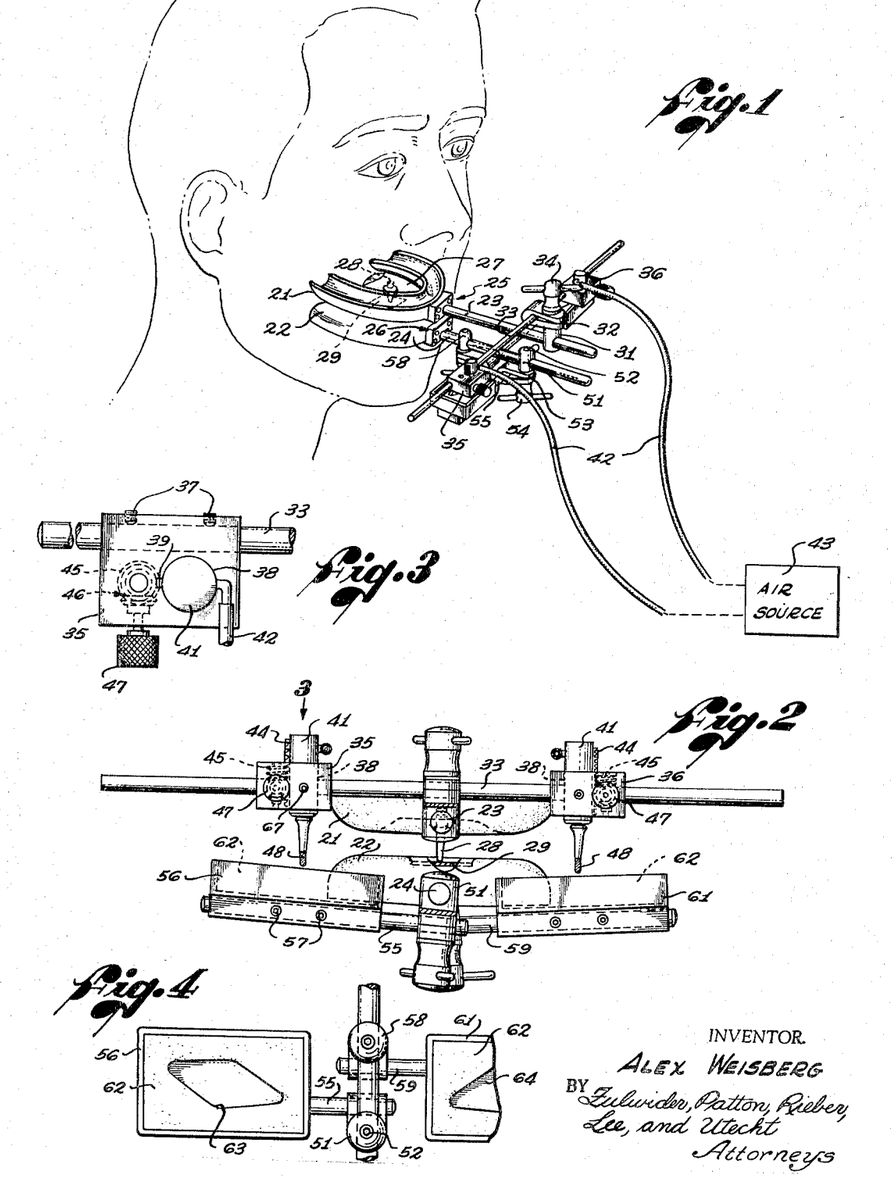
FIGURE 1 is a perspective view of the apparatus for cutting the recordings or three-dimensional pantographs of the patient's jaw movements.
FIGURE 2 is a front elevational view of the apparatus of FIGURE 1.
FIGURE 3 is a partial plan view taken at the numeral 3 of FIGURE 2.
FIGURE 4 is a cut-away plan view of the resulting recordings or three-dimensional pantographs secured from the use of the apparatus of FIGURES 1 through 3.

The construction of the recordings or three-dimensional pantographs of the relative movements of a dental patient's jaws is illustrated in FIGURES 1 through 4 of the drawings. Upper and lower clutches 21 and 22 are shown in FIGURE 1 mounted in a patient's mouth in conventional manner by means of soft cementing material in the clutches. Forwardly projecting supporting bars or rods 23 and 24 are removably carried by the clutches 21 and 22, respectively, as at 25 and 26. The upper clutch 21 is provided with a transverse plate in which is adjustably threaded a bearing stud 28 having a rounded end slidably engaging a transverse plate 29 on the lower clutch 22. The position of the bearing stud 28 is preferably adjusted to separate the clutches 21 and 22 only sufficiently to permit unimpeded movement of the lower clutch as the patient's jaw moves laterally in all directions about the temporomandibular joints.

Upon the upper supporting bar 23 is adjustably mounted an upstanding post 31 as by a bottom set screw, not shown. Upon the post 31 is mounted a split clamp 32 adjustably receiving a crossbar 33, the clamp 32 being regulated by manual nut 34.

A pair of supporting blocks 35 and 36 are adjustably mounted on opposite ends of the crossbar 33, as by set screws 37. Each block 35, 36 has a vertical bore 38 therethrough communicating with a slot 39. In each bore 38 is adjustably mounted an air turbine 41 connected by flexible tubing 42 to a source of air under pressure 43. The air turbines 41 have side racks 44 rigidly secured thereto which extend into the slots 39 to engage worm gears 45. The worm gears 45 are connected through bevel gears 46 to outside knobs 47 by means of which the worm gears 45 are rotated to move the air turbines 41 vertically within the bores 38. High-speed rotary cutters 48 having carbide or diamond cutting edges are mounted in the air turbines 41 to be rotated thereby. The cutters 48 may be similar to those conventionally used in the drilling and grinding of teeth.

On the lower clutch bar 24 is adjustably mounted a post 51, as by a set screw 52. The post 51 carries a split clamp 53 manipulated by a manual nut 54 to adjustably support a short crossbar 55 on which a small tray 56 is adjustably mounted by set screws 57. Similarly, a post 58 is also adjustably mounted on the clutch bar 24 and supports a short crossbar 59 on which is adjustably mounted a tray 61. The trays 56 and 61 support hard plastic or other material 62 in which the three-dimensional recordings or pantographs 63 and 64 are cut by the rotary cutters 48.

Figure 5:
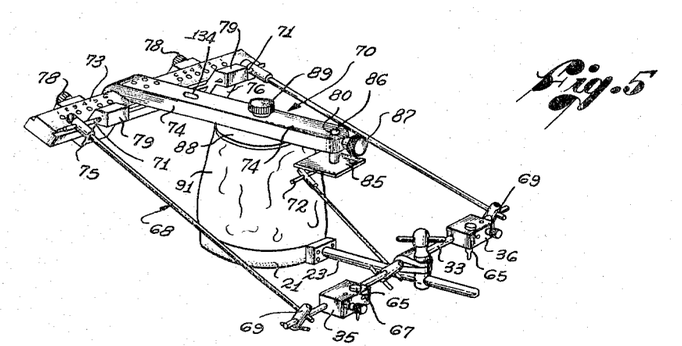
FIGURE 5 is perspective view showing the mounting of the upper clutch on the upper frame of the cutting jig.

FIGURE 5 illustrates the mounting of the upper clutch 21, the clutch bar 23, crossbar 33 and supporting blocks 35 and 36 to the upper frame for the cutting jig 60. The air turbines 41 have been removed and replaced by tracer pins 65 adjustably held in the bores 38 by set screws 67. Alternatively, the turbines may be retained and the inactive cutters 48 used as tracers. A hinge bow 68 has been mounted on the ends of the crossbar 33 in conventional manner, as by posts 69. The hinge bow 68 has hinge axis styli 71 and a locating stylus 72 which are positioned at the hinge axis and locating point for the patient being examined. The determination of the hinge axis for the joints and of the locating point are done by conventional dental techniques and form no part of the present invention. The ends of the styli 71 are thereby located on the hinge axis of the temporomandibular joints of the patient, the hinge axis being an imaginary line connecting the centers of rotation of the condyles of the joints.

The upper frame 70 of the analog cutting jig 60 is made up of a crossbar 73 and a forwardly projecting arm 74 on which the upper clutch is supported. On the crossbar 73 are adjustably supported a pair of temporary locating blocks 75 and 76 having flanges 77 thereon interengaging with complementary notches in the crossbar 73 for sliding movement relative thereto and maintained in adjusted position by manual set screws 78. Each of the blocks 75, 76 has a forwardly projecting arm integral therewith and alignment means at opposite sides thereof —in the specific embodiment illustrated, dimples 81 in the outside walls and projecting points 82 on the inside walls. The arms 79 are provided with transversely elongated, downwardly opening pockets 83 in which are temporarily received the upper ends of jig pins 84 for temporary support of the upper jig frame. The centers of the dimples 81 and the projecting points 82, as well as the ridges of the pockets 83, are aligned at what is to be the simulated hinge axis.

A locating plate 85 is mounted on a supporting post 86 which is supported in an opening 80 adjacent to the end of the arm 74 by a manual set screw 87. A removable supporting disc 88 is secured to the arm 74 by a manual screw 89 and is keyed against rotation relative to the arm. The upper clutch 21 is mounted to the disc 88 by a plaster body 91, as will be explained hereinafter.

Figures 6, 7, 8, 9:
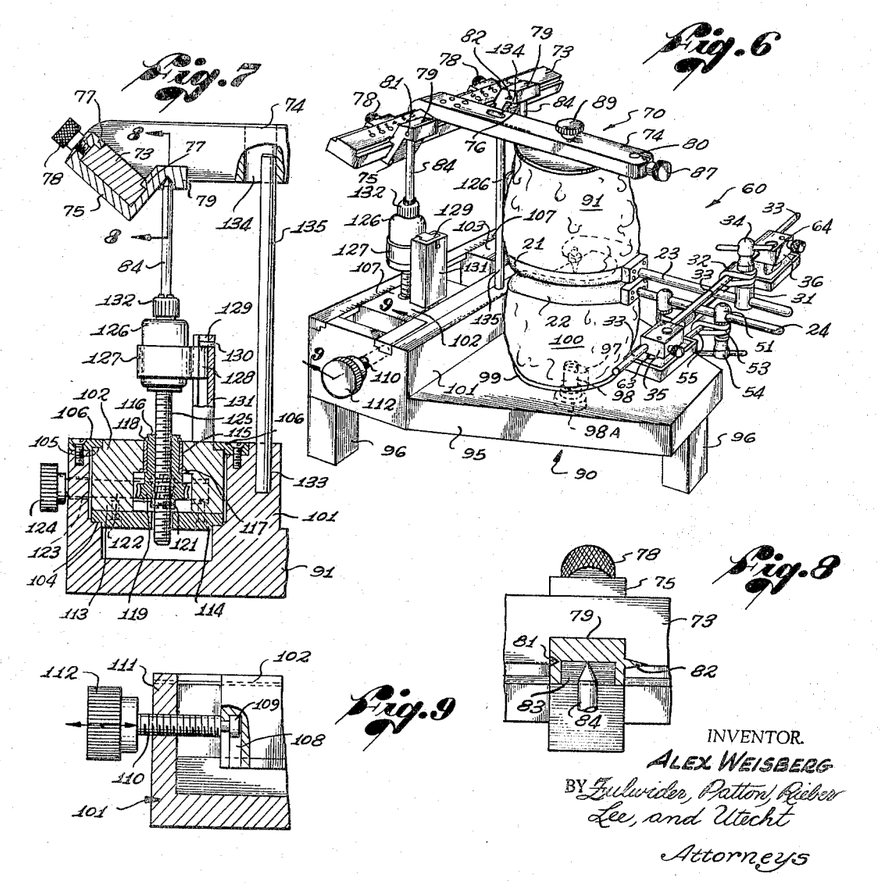
FIGURE 6 is a perspective view of the cutting jig with both clutches and the recordings mounted therein.
FIGURE 7 is a cut-away vertical sectional view through the rear portion of the jig of FIGURE 6.
FIGURE 8 is a detailed sectional view on the line 8—8 of FIGURE 7.
FIGURE 9 is a detailed sectional view on the line 9—9 of FIGURE 6.
Figure 10:
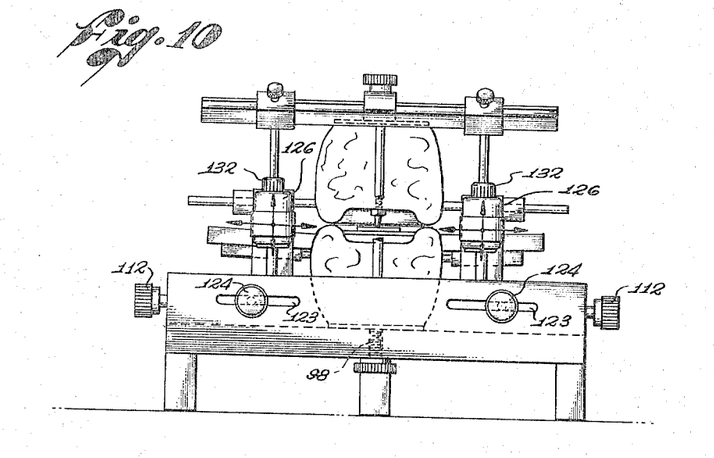
FIGURE 10 is a rear elevational view of the jig of FIGURE 6.

The lower frame 90 of the analog cutting jig 60 will now be described. This includes a base plate 95 supported as a stable platform upon legs 96. The base plate 95 has an axially extending slot 97 therethrough receiving a stud 98 tapped into a mounting disc 99 which thereby has limited axial movement relative to the base plate, the disc 99 being keyed against rotation. A manual head 98A on the stud 98 tightens against the base plate to hold the disc in position. The lower clutch 22 is mounted on the disc 99 by a plaster body 100 in centric relation to upper clutch 21 and with stud 98 in its rearward position in the slot 97.

The base plate 95 has an integral, hollow, rear boss 101 in which are mounted a pair of supporting blocks 102 and 103 for adjustable movement transversely of the base plate 95. The blocks 102 and 103 have complementary notch engagement at 104 with the interior of boss 101 and at 105 with removable strips 106 which serve to hold the blocks 102, 103 in assembled relation. The rear strip 106 is provided with measuring indicia at 107. The outside wall of each block 102, 103 is provided with a T-shaped slot 108 in which is rotatably received the head 109 of an adjusting screw 110 threaded in to the adjacent end wall 111 of the boss 101 and turned by a manual knob 112 to individually adjust the positions of the blocks 102 and 103 transversely of the base plate 95.

Each block 102, 103 is provided with vertically adjustable supporting means, only one of which is shown in FIGURES 6 and 7. Each of the blocks 102, 103 has a generally central cavity 113 closed by a bottom plate 114. A bore 115 extends from the cavity 113 through the top of the block. Within the bore 115 is located a cylindrical nut 116 so as to be rotatable therein but prevented from moving axially by a collar 117 and a snap ring 118. Upon the lower portion of the nut 116, within the cavity 113, is a worm gear 119 meshing with a worm 121 rigidly secured on a shaft 122 journaled in the mounting block and extending through an elongated slot 123 in the back wall of the boss 101. Manual knobs 124 are secured to the ends of the shafts 123 at the back of the jig.

A screw 125 is threaded into each nut 116 but is prevented from rotating by being rigidly conected to and supporting the casing of a motor 126. A band 127 extends around each motor 126 rigid therewith and has a T-shaped extension 128 thereon guided, for vertical movement only, in a T-shaped slot 129 in a bracket 131. The motors 126 are disposed with their axes of rotation vertical and the upper ends of their rotors are provided with chucks 132 to receive the jig 84 or cutting tools. Since the nuts 116 are rotatable but are held against axial movement, their rotation will be accompanied by vertical movement of the screws 125 and the motors 126.

The boss 101 is provided with a center plane locating hole 133 and the upper frame forearm 74 with a slot 134 to receive an elongated locating pin 135.

Figures 11, 12, 14:
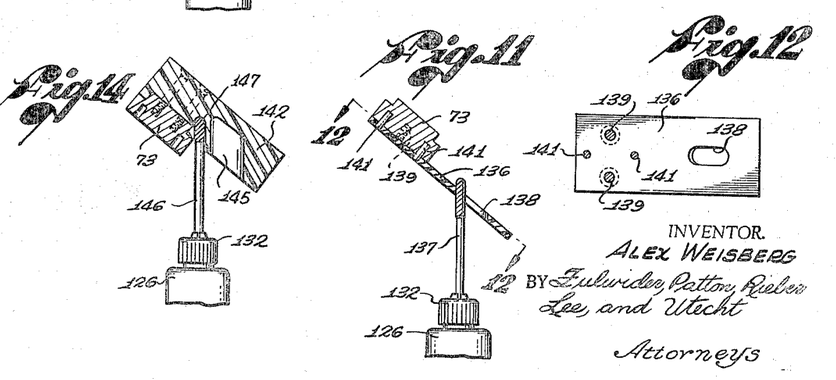
FIGURE 11 is a detailed vertical sectional view showing the cutting of a guide plate.
FIGURE 12 is a view of a finished guide plate taken on the line 12—12 of FIGURE 11.
FIGURE 14 is a detailed vertical sectional view showing the cutting of an analog indexing hole for the intercondylar spacing.

FIGURE 11 illustrates the intermediate step of cutting one of the guide plates 136 by a rotary cutting tool 137 which has been substituted for the jig pin 84. There will be two of the guide plates 136 corresponding to the two joint analogs. The completed guide plate 136 is shown in FIGURE 12 having a guide slot 138 therein. The guide plates 136 are mounted against the inclined under surfaces of the crossbar 73, as by studs 139, and are further held against rotation relative thereto by pins 141 disposed in mating indexing holes in the crossbar and guide plates.

Figure 13:
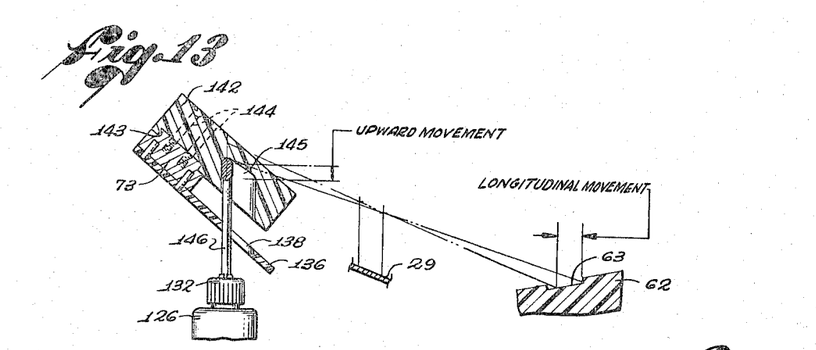
FIGURE 13 is a partially diagrammatic view illustrating the cutting of an analog socket.

FIGURE 13 illustrates the cutting of the analog block 142 mounted on the inclined upper surface of the crossbar 73 by the cooperating notch engagement at 143 and by studs 144. The analog socket 145 is cut in the under side of the analog block by a rotating router or cutting tool 146 mounted in the chuck 132 and having its lateral displacement guided by the engagement of its shank with the walls of the guide slot 138 in guide plate 136. The cutting tool 146 has a semi-circular cutting end having a radius which is equal to the radius of the end of the articulator pin with which the analog is to be used, as in FIGURE 16. The shank of the cutting tool 146 has the same diameter as the diameter of the cutting end of the tool 137.

The motors 126 may be of any desired construction and operate under any source of power. Since weight is no particular problem in the jig, the motors may conveniently be electrically driven. Air turbines or belts drives are alternative constructions.

FIGURE 14 shows the cutting of an indexing hole 147 in the analog block 142 for determining the intercondylar spacing of the articulator pins.

Figure 15:
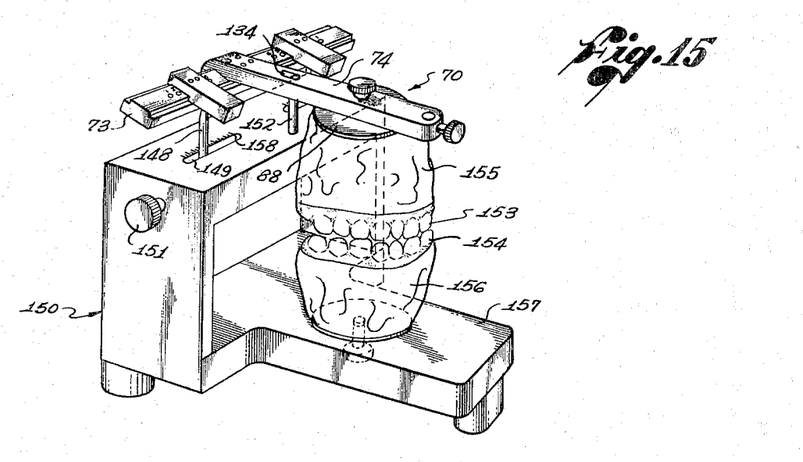
FIGURE 15 is a perspective view of an articulator showing the final mounting of blocks containing the joint analogs and of the diagnostic dental models.

FIGURE 15 shows an articulator 150 using the analogs according to the present invention to reproduce on dental models the action of the patient's temporomandibular joints.

Figure 16:
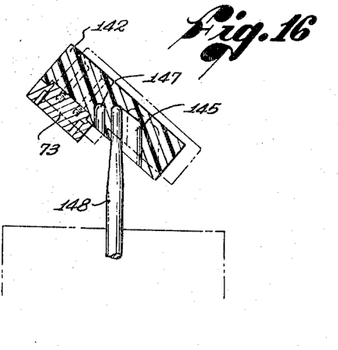
FIGURE 16 is a detailed vertical sectional view showing the cooperation between an analog and an articulator pin.

FIGURE 16 illustrates in full lines the positioning of an analog pocket 145 over the end of an articulator pin 148; and in phantom, the position where the indexing hole 147 aligns with the pin.

The articulator 150 may be of simple construction having a pair of articulator pins 148 extending through slots 149 and individually adjustable laterally of the articulator by individual side knots 151. The traversing mechanisms for the pins 148 are not shown but may be conventional or may follow that shown in FIGURE 9 for supporting blocks 102, 103 of the analog cutting jig. The articulator includes a removable center plane locating pin 152 received in the forearm slot 134. The pins 148 may alternatively be manually slid to adjusted positions and locked hterein. Indicia 158 give a reading of the pin position.

The base frame of articulator 150 has a base plate 157 with a lower mounting disc 99 on which a lower diagnostic dental model 154 may be supported by plaster body 156. The movable upper frame of the articulator may be the same or identical with the upper frame 70 of the analog cutting jig 60. It is therefore made up of the crossbar 73 and forearm 74 and an upper diagnostic dental model 153 is supported from the disc 88 by a plaster body 155.

The construction of the analogs of the temporomandibular joints of a patient according to the present invention will now be described.

The parts illustrated in FIGURES 1 through 3 are assembled on the clutches 21, 22 mounted in the patient's mouth in conventional manner and in any convenient order, in that the clutches may be seated before or after the record plates and air turbines are attached thereto. The bearing stud 28 is adjusted so that the occlusal surfaces of the clutches 21, 22 will be separated for free lateral motion of the patient's jaw in all directions without interference between the clutches. In this initial assembly, the air turbines 41 will be moved to their upper positions where they are out of engagement with the record material 62 and the trays 56, 61 will be placed in adjusted positions about the axis of the clutch bar 24 and the axes of the cross-bars 55 and 59 so that the trays will move in planes roughly parallel to their centric planes to substantially equalize the depth of cut over the recording area. The material 62 is preferably a hard plastic, such as Bakelite, which must be cut out by a power tool to leave a hard and rigid three-dimensional pantograph which may be easily followed by a tracer without impairment of the integrity of its surfaces. This distinguishes from the conventional use of soft waxes or plastic materials which are impressed, deformed or pressure cut to make recordings.

With the apparatus in the position of FIGURE 1, air under pressure is fed through the tubing 42 to the turbines 41 and lateral movement of the patient's jaw about the temporomandibular joint is effected in all directions while the knobs 47 are rotated to gradually and progressively feed the cutters 48 into the hard plastic material 62. The axial movement of the air pistons 41 is continued until a substantial depth of cut has been made to form three-dimensional pantographs 63, 64 in the hard plastic 62. This will provide a definition of the border limits of the lateral displacements of the jaws by the outlines of the recordings and of the vertical displacements from such lateral movements, by the bottom surfaces of the recordings. The finished, hard plastic recordings or pantographs are shown in FIGURE 4. Lateral as used herein to apply to jaw movements and displacements is intended to include protrusive as well as transverse and all combinations thereof.

The air turbines 41 may be locked by set screws 67 in the lowest positions to which they were moved in the cutting operation and the inactive cutters 48 used as tracer points in subsequent operations. Or the air turbines may be removed and tracer pins 65 substituted therefor, the ends of the tracer pins having the same configuration and size as the cutters 48 and being mounted at the same distance below the blocks 35, 36 as the final cutting position of the ends of the cutters.

The hinge bow 68 is now mounted on the crossbar 33 and the styli 71 and 72 adjusted into the proper positions for the patient's hinge axis and locating point, either from tattooed marks on the patient or by standard dental techniques. The clutches 21 and 22 may then be removed from the patient's mouth.

The upper clutch 21 is now mounted to the forearm 74 of the upper frame 70 as shown in FIGURE 5. The temporary locating blocks 75 and 76 are placed equidistant from the center of the bar 73 and spaced apart the measured distance between the styli 71 so that the ends thereof will be received in the dimples 81. With the stylus 72 then located at the plate 85, the position of the clutch 21 relative to the arm 74 is positively determined and the plaster body 91 is filed in between the clutch 21 and the mounting disc 88 to mount the clutch in proper position relative to the forearm 74. The hinge bow 68 may now be removed and the upper frame 70 mounted in temporary relation on the lower frame or base of the cutting jig.

For this purpose the motors 126 and pins 84 are placed in their uppermost positions with guides 128 engaging the stops 130. The points of the pins 84 will therefore lie on the patient's simulated hinge axis. The pockets 83 in the blocks 75 and 76 are placed over the ends of the pins 84 as shown in FIGURE 8 to provide temporary support for the back of the upper frame 70. At the same time, the pin 135 is preferably inserted in the hole 133 and slot 134 in order to center the upper frame 70 relative to the axis of the base plate 95. The lower clutch 22 is now located on the mounting disc 99 by means of the plaster body 100 according to conventional dental practice for articulator mounting. In this operation the front end of the upper frame 70 may be supported by hand or by an offset rod mounted within the hole 80 and bearing on the top face of the base plate 95. The clutch 22 is mounted centric with the clutch 21 by conventional dental practice in articulators, such as by positioning the pins 65 in the pantographs or by matching impressions in temporary plaster material placed between the clutches in their centric position before removal from the patient's mouth. The parts will now be in the position shown in FIGURE 6.

The proper intercondylar spacing of the pins 84 is now established. This is accomplished by moving the temporary locating blocks 75 and 76 to the outside of the pins 84 so that the ends of the pins 84 and the ends of the points 82 are juxtaposed. The central locating pin 135 is also removed and the upper frame 70 supported at the three points provided by the ends of the tracing pins 65 and the clutch spacing stud 28. The tracing pins 65 are moved along the outlines of the recordings or pantographs 63 in known manner until the points of the pins 84 are located to remain indexed with the ends of the points 82 during the respective tracing operations. This determination of the proper intercondylar spacing between the pins 84 is according to known dental articulator practice and embodies the movement of the pins transversely of the base plate 95 by manipulating the knobs 112 to move the mounting blocks 102, 103 bodily in the transverse directions. As the pins are moved transversely, the temporary locating blocks 75 and 76 are slid along the crossbar 73 to maintain the ends of the points 82 at the ends of the pins 84. After adjustment, the pins 84 will be spaced at the patient's intercondylar distance and the ends of the pins will be on the hinge axis of the joint.

The upper frame 70, with the clutch 21 attached thereto, is now removed from the jig and the motors 126 run to their lowermost positions by manipulating the knobs 124 to rotate the worms 121, worm gears 119, and nuts 116 to lower the screws 125 and the motors therewith. Pins 84 are removed from the chucks 132 and cutters 137 substituted therefor. The length of the cutter 137 is not important, since it is used only to cut the lateral guide slot 138, but the diameter of the cutter portion thereof should be the same as the diameter of the shank of the cutter 146.

The guide plates 136, of a rigid plastic material such as Bakelite, are mounted on the under surface of the crossbar 73, the temporary locating blocks 75 and 76 having been removed from the crossbar. The motors 126 are started to rotate the cutters 137 and the motors are progressively moved upwardly at the same time that the ends of the pins 65 or the cutters 48, as the case may be, follow the outside wall defining the outer outline of the recordings or pantographs 63, 64. Both tracer pins must be in contact with the outside walls defining the recordings at all times to secure correct guide slots 138 in the plates 136. With the plate mounted for the cutting operation as shown in FIGURE 11, the guide slots will be visible to the eye of the operator and may be checked after the cutting operation to insure their accuracy by again tracing the outer outline walls of the recordings to make sure that no air space occures between the outer surfaces of the cutting tools 137 and the adjacent walls defining the slots 138. Should either tracer leave the outline wall of its recording during the cutting operation, an incorrect guide slot would be cut and the visual inspection of the coincidence of the slot walls and the cutters when the outline walls of the recording are traced after the cutting operation is an important check on the correctness of the slots.

After cutting the guide slots, the motors 126 are again moved downwardly by manipulating the knobs 124. The blocks 102 and 103 remain in their adjusted positions spaced at the proper intercondylar distance. The cutters 146 are now substituted for the cutters 137 with the cutting ends of the cutters 146 above the plates 136 so that the shanks of the cutters engage the walls defining the slots 138. The slots 138 thereby positively limit the lateral movements of the guide plates and crossbar, regardless of the positions of the tracer pins 65 in the recordings 63, 64.

Figure 17:
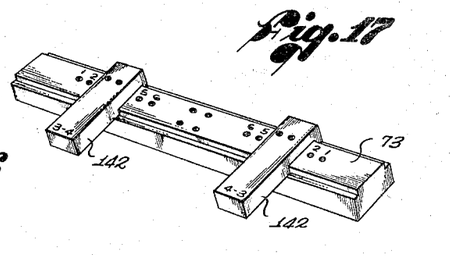
FIGURE 17 is a perspective view of the double analog block and bar combination as used in the articulator of FIGURES 15.
Figure 18:
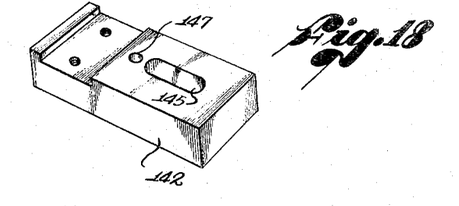
FIGURE 18 is a bottom perspective view of an analog block removed from its crossbar mounting.

The analog blocks 142 are now secured to the upper surface of the crossbar 73 in positions therealong whereby the axes of the block are generally above the axes of the slots 138 so that pocket 145 will be cut generally along the axes of the blocks 142. The positions of the analog blocks on the crossbar are now preferably stamped directly on the blocks for future reference purposes so that they may be always placed on this or an identical crossbar at the same positions. Such identification is indicated in FIGURE 17 wherein the mounting holes on the crossbar are numbered and the holes in which the analog blocks are secured by the studs 144 are marked on the back faces of the blocks. The analog blocks are shown mounted in the holes 3 and 4 and these numbers are stamped in the proper order on the back faces of the blocks.

The cutters 146 are now rotated by the motors 126 and the motors and tools are progressively moved upwardly to cut the sockets 145 in the analog blocks 142 while the tracing pins 65 or the cutters 48, as the case may be, are moved over the entire bottom area of the recordings or pantographs 63, 64 in contact with the bottom surfaces thereof. In the uppermost positions of the motors 126, with the guides 128 against the stops 130, the end surfaces of the sockets 145 will be cut to the shapes dictated by the contours of the bottom walls of the recordings. The side and end walls of the sockets 145 will be determined by the slots 138 which positively limit lateral movements of the analog blocks 142 in all directions relative to the cutters 146. The radius of the end of the cutting tool 146 is identical with the radius of the end of the articulator pin with which the analog is to be used, and the height of the cutting tool 146 is greater than the height of pin 84 by that radius. This places the hinge axis about which articulation is effective at the center of the radius.

The movements of an analog block 142 relative to a cutter 146 are indicated diagrammatically in FIGURE 13, the analog block being supported during all of the cutting operation at the three points provided by the ends of the tracer pins 65 and the spacer stud 28. The ends of the tracer pins 65 are maintained in contact with the bottom surfaces of the recordings 63, 64 in the hard plastic 62, while at the same time the spacer stud 28 remains in contact with the plate 29. This effects the indicated movements of the analog block 142 while its lateral movements in all directions are limited by the engagement of the cutter shank with the walls of the slot 138 in the guide plate 136.

When the cutting of the analog sockets 145 in the blocks 142 is complete, the guide plates 136 may be detached from the crossbar 73 and discarded, as they have no further function. The indexing hole 147 is then cut in the bottom surface of the analog block 142 to provide a ready future reference for setting the intercondylar distance between the articulator pins. For this purpose the motors 126 are lowered out of the sockets 145 by manipulating the knobs 124, the stud 98 is loosened, and the clutches 21 and 22 and the parts attached thereto are moved bodily forward along the axis of the base plate 95, the stud 98 moving in the slot 97. The clutch 21 is maintained in its centric position with respect to the clutch 22 and the analog blocks 142 move into their forward positions shown in FIGURE 14. The rotating cutters 146 are now moved upwardly to cut the indexing holes 147 outside of the sockets 145 and these holes 147 will be spaced apart at the patient's intercondylar distance and will provide a ready reference for future location of the articulator pins.

With the cutting of the holes 147, the motors 126 and cutters 146 are moved downwardly and the upper frame 70 removed from the jig. The clutch 21 and its plaster support are removed from the frame which may then be used in the articulator 150 of FIGURE 15. Alternatively, an identical forearm may be substituted for the forearm 74, or the analog blocks may be removed and mounted on the crossbar of a new frame identical with the frame 70 at the recorded mounting holes.

Where the analog blocks are always to be used with the same crossbar 73, the crossbar and blocks may be filed as a unit for future use for the patient whom they identify. Since the analog blocks 142 have their mounting holes recorded thereon, they may be removed from the crossbar 73 and filed alone for use in the future with an identical crossbar having identical mounting holes.

The use of the analogs in an articulator to duplicate the action of the temporomandibular joints of the patient for dental models is shown in FIGURES 15 and 16. The upper diagnostic dental model 153 is located on the forearm 74 by conventional dental techniques, using a hinge bow and temporary mounting blocks, similar to the blocks 75 and 76, associated either with the same or an identical crossbar 73 as that on which the analog blocks 142 are mounted.

The upper frame is centered with respect to the articulator by the pin 152 and moved forwardly to transversely align with the indexing holes 147 with the articulator pins 148 which are then moved transversely into vertical alignment with the indexing holes, whereby the pins 148 will be spaced at the patient's intercondylar spacing. The pin 152 is removed and the analog sockets 135 placed over the ends of the articulator pins. The lower diagnostic dental model 154 is now mounted on the lower mounting disc 99 on the base plate 157 in centric relative to the upper model 153.

The movements of the ends of the analog sockets 145 relative to the ends of the articulator pins 148 duplicate the action of the temporomandibular joints of the patient and provide correct articulation of the upper diagnostic dental model 153 relative to the lower diagnostic dental model 154 to simulate for the dentist the operation of the masticatory mechansim of the patient and the relation between the patient's jaw movements and teeth contacts.

As the action of the temporomandibular joints of individuals remains substantially constant over a long period of time, the analogs once constructed may be filed and reused to simulate the masticatory mechanism of the patient at any number of future investigations and corrections. The analogs therefore provide permanent, customized, very accurate reproductions of the action of the temporomandibular joints of the patient.

While certain preferred embodiments of the invention have been specifically illustrated and described, it will be understood that the invention is not limited thereto as many variations will be apparent to those who are skilled in the art, and the invention is to be given its broadest interpretation within the terms of the following claims.

I claim:

1. A joint analog for dental articulation comprising: an element adapted to be rigidly secured to the upper frame of an articulator and having a downwardly directed pocket therein having a shape customized to the temporomandibular joint of an indivdual patient, said downwardly directed pocket being locatable over the upstanding pins of an articulator spaced at the intercondylar distance of that patient to simulate the hinge axis of the patient at the center of curvature of the end of the articulator pin; indexing means on said analog adapted to cooperate with indexing means on the other analog of a pair so that, when mounted on an articulator, the indexing means establish the predetermined intercondylar distance for the patient, said indexing means comprising a hole in the bottom wall of the analog element outside of the pocket and of a size adapted to closely receive the end of the articulator pin to locate an articulator pin at the position of the simulated condyle for the patient.

2. As an article of manufacture, a dental articulator part comprising: a top frame crossbar adapted to have the forearm of an articulator removably secured centrally thereof; and a pair of plastic blocks mounted on said crossbar in fixed, rigid relation, said blocks having downwardly directed pockets cut entirely therein to receive upstanding articulator pins placed at the intercondylar distance of the patient, the upper surfaces of the pockets being shaped to cooperate with the pins to duplicate in the articulator the action of the temporomandibular joints of the patient, said blocks having indexing holes in their bottom walls outside of the pocket shaped and located to receive the ends of the articulator pins to establish the intercondylar distance.

3. The method of constructing analogs of the temporomandibular joints of a dental patient comprising: cutting hard, three-dimensional recordings of the relative movements of the patient's jaws; translating the outside outline only of said recordings into guide slots adjacent the simulated hinge axis of the patient's joint; and translating the recordings into analog sockets substantially at the simulated hinge axis while limiting the lateral dimensions of the analog sockets by the guide slots.

4. The method of forming analogs of a dental patient's temporomandibular joints which comprises: constructing three-dimensional pantographs of the relative lateral movements of the patient's jaws; translating the outside outline only of said pantographs into guide slots adjacent the simulated hinge axis of the patient's joints; and translating the pantographs into downwardly directed analog sockets terminating adjacent to the simulated hinge axis while limiting the lateral dimensions of the analog sockets by the guide slots.

5. The method of constructing analogs of the temporomandibular joints of a dental patient comprising: cutting hard three-dimensional recordings of the relative movements of the patient's jaws; translating the outside outline only of said recordings into guide slots adjacent the simulated hinge axis of the patient's joint; translating the recordings into analog sockets substantially at the simulated hinge axis while limiting the lateral dimensions of the analog sockets by the guide slots; and marking on said analogs the position of said patient's condyle transversely of the analog whereby with the analogs located the proper distance apart, said markings will locate the horizontal spacing between the condyles.

6. The methods of constructing analogs of the temporomandibular joints of a dental patient comprising: cutting hard, three-dimensional pantographs of the relative lateral movements of the patient's jaws; mounting temporary guide plates adjacent the simulated hinge axis of the patient's joints; spacing cutting means beneath said guide plates at the patient's intercondylar distance; moving said guide plates in accordance with the outer outline only of said recordings while elevating said cutting means to construct guide slots in said guide plates; mounting analog blocks rigid with said guide plates; and translating the entire area of said pantographs into analog sockets cut in said analog blocks while limiting the lateral dimensions of the analog sockets by said guide slots.

7. The method of constructing analogs of the temporomandibular joints of a dental patient comprising: cutting hard, three-dimensional pantographs of the relative lateral movements of the patient's jaws; mounting temporary guide plates adjacent the simulated hinge axis of the patient's joints; spacing cutting means beneath said guide plates in accordance with the outer outline only of said pantographs while elevating the cutting means to construct guide slots in said guide plates; locating analog blocks rigidly with respect to said guide plates above the cutting means; and cutting analog pockets in said analog blocks by moving the blocks and guide plates in accordance with tracings of the entire area of the pantographs while elevating the cutting means and limiting the lateral movements of the blocks by engagement of the guide slots walls with non-cutting portions of the cutting means.

8. The method of forming analogs of a patient's temporomandibular joints which comprises: securing a pair of rotary cutters to one jaw of the patient; spacing said cutters substantially equidistant from the vertical plane dividing the patient's face; mounting a pair of hard plastic recording blanks to the other jaw of the patient beneath said rotary cutters; rotating said cutters and moving them toward said recording blanks while the patient's jaw is moved laterally in all directions so as to cut into the hard plastic blanks three-dimensional recordings of the relative jaw movements formed by hard non-deformable surfaces; and translating said recordings into permanent analog elements by cutting pockets in the elements governed by the three-dimensional shape of the hard recordings.

9. The method of constructing analogs of the temporomandibular joints of a dental patient comprising: cutting hard, three-dimensional pantographs of the relative lateral movements of the patient's jaws; mounting temporary guide plates adjacent the simulated hinge axis of the patient's joints; spacing cutting means beneath said guide plates at the patient's intercondylar distance; moving said guide plates in accordance with the outer outline only of said recordings while elevating said cutting means to construct guide slots in said guide plate; checking the accuracy of said guide slots by visually verifying the coincidence of the cutting means and slot walls while tracing the outer outline only of the pantographs; and cutting analog sockets by translating the entire area of the pantographs thereto while limiting the lateral dimensions of the sockets by the guide slots.

10. The method of forming analogs of a patient's temporomandibular joints which comprises: securing a pair of rotary cutters to one jaw of the patient; horizontally spacing said cutters substantially equidistant from the vertical plane dividing the patient's face; mounting a pair of hard plastic recording blanks to the other jaw of the patient beneath said rotary cutters; rotating said cutters and moving them toward said recording blanks while the patient's jaws are relatively moved laterally in all directions so as to cut into the hard plastic blanks three-dimensional recordings of the relative jaw movements formed by hard non-deformable surfaces; transferring the hard recordings and tracing elements therefor to a cutting jig; locating a pair of upwardly directed cutting tools spaced apart at the intercondylar distance of the patient in the vertical plane of the simulated hinge axis of the patient; mounting analog supporting material above said vertical cutters; and moving said analog material in conformance with relative motion between said recordings and tracing elements while elevating the ends of said cutting tools to the simulated hinge axis so as to cut permanent analogs in said analog supporting material.

11. The method of forming analogs of a patient's temporomandibular joints which comprises: securing a pair of rotary cutters to one jaw of the patient; horizontally spacing said cutters substantially equidistant from the vertical plane dividing the patient's face; mounting a pair of hard plastic recording blanks to the other jaw of the patient beneath said rotary cutters; rotating said cutters and moving them toward said recording blanks while the patient's jaws are relatively moved laterally in all directions so as to cut into the hard plastic blanks three-dimensional recordings of the relative jaw movements; transferring the hard recordings and tracing elements therefor to a cutting jig; locating a pair of upwardly directed cutting tools spaced apart at the intercondylar distance of the patient in the vertical plane of the simulated hinge axis of the patient; mounting guide plates controlled by said tracing element above said cutting tools; cutting border limit slots in said guide plates by elevating the cutting tools while following the outside outline only of said recordings by said tracing elements; mounting analog blocks to said guide plates; and cutting analog pockets in said analog blocks by elevating the ends of cutting tools while moving said analog blocks in conformance with relative motion between the recordings and tracing elements but with the lateral movements of the blocks limited by the guide slots.

12. The method of forming analogs of a patient's temporomandibular joints which comprises: securing a pair of rotary cutters to one jaw of the patient; horizontally spacing said cutters substantially equidistant from the vertical plane dividing the patient's face; mounting a pair of hard plastic recording blanks to the other jaw of the patient beneath said rotary cutters; rotating said cutters and moving them toward said recording blanks while the patient's jaws are relatively moved laterally in all directions so as to cut into the hard plastic blanks three-dimensional recordings of the relative jaw movements; transferring the hard recordings and tracing elements therefor to a cutting jig; locating a pair of upwardly directed cutting tools spaced apart at the intercondylar distance of the patient in the vertical plane of the simulated hinge axis of the patient; mounting guide plates above said cutting tools; cutting border limit slots in said guide plates by elevating the cutting tools while following the outside outline only of said recordings by said tracing elements; visually checking the accuracy of the guide slots by tracing the outside outline of the recordings while visually verifying the conformance of the cutting tool and guide slot wall; mounting analog blocks rigidly with said guide plates; and cutting analog pockets in said analog blocks by elevating the ends of cutting tools while moving said analog blocks in conformance with relative motion between the recordings and tracing elements but with the lateral movements of the blocks limited by the guide slots.

13. The method of forming analogs of a patient's temporomandibular joints which comprises: securing a pair of rotary cutters to one jaw of the patient; horizontally spacing said cutters substantially equidistant from the vertical plane dividing the patient's face; mounting a pair of hard plastic recording blanks to the other jaw of the patient beneath said rotary cutters; rotating said cutters and moving them toward said recording blanks while the patient's jaws are relatively moved laterally in all directions so as to cut into the hard plastic blanks three-dimensional recordings of relative jaw movements formed by hard non-deformable surfaces; transferring the hard recordings and tracing elements therefor to a cutting jig; locating a pair of upwardly directed cutting tools spaced apart at the intercondylar distance of the patient in the vertical plane of the simulated hinge axis of the patient; mounting guide plates above said cutting tools; cutting border limit slots in said guide plates by elevating the cutting tools while following the outside outline only of said recordings with said tracing elements; mounting analog blocks rigidly with said guide plates; cutting analog pockets in said analog blocks by elevating the ends of cutting tools while moving said analog blocks in conformance with relative motion between the recordings and tracing elements but with lateral movements of the blocks limited by the guide slots; and cutting condyle indexing holes in the bottoms of the analog blocks outside of the pocket areas.

14. The method of forming analogs of a patient's temporomandibular joints which comprises: securing a pair of rotary cutters to one jaw of the patient; horizontally spacing said cutters substantially equidistant from the vertical plane dividing the patient's face; mounting a pair of hard plastic recording blanks to the other jaw of the patient beneath said rotary cutters; rotating said cutters and moving them toward said recording blanks while the patient's jaws are relatively moved laterally in all directions so as to cut into the hard plastic blanks three-dimensional recordings of relative jaw movements formed by hard non-deformable surfaces; transferring the hard recordings and tracing elements therefor to a cutting jig; locating a pair of upwardly directed cutting tools spaced apart at the intercondylar distance of the patient in the vertical plane of the simulated hinge axis of the patient; mounting guide plates above said cutting tools; cutting border-limiting slots in said guide plates by elevating the cutting tools while following the outside outline only of said recordings with said tracing elements; mounting analog blocks rigidly with said guide plates; cutting analog pockets in said analog blocks by elevating the ends of cutting tools while moving said analog blocks in conformance with relative motion between recordings and tracing elements but with lateral movements of the blocks limited by the guide slots; moving the analog blocks bodily forwardly to the jig to locate the cutting holes outside of the analog pocket area; and elevating the cutting tools to cut condyle locating holes in the analog blocks in back of the analog pockets.

15. Apparatus for cutting three-dimensional pantographs of the relative movements of a dental patient's jaws in relatively hard material comprising: a pair of clutches adapted to be connected respectively to the upper and lower jaws of the patient and each having a supporting bar secured to and extending forwardly thereof; means for supporting a pair of substantially hard, non-deformable recording elements on one of said bars; a pair of rotary driving means; means supporting said rotary driving means on the other of said bars above said recording elements; a rotary cutter mounted on and driven by each of said rotary driving means; and means for effecting progressive longitudinal movement of said rotary cutters into said recording elements while effecting relative lateral movements of the patient's jaws in all directions so as to cut three-dimensional pantographs in said recording elements.

16. Apparatus for cutting three-dimensional pantographs of the relative movements of a dental patient's jaws in relatively hard material comprising: supporting means mountable to the upper and lower jaws of the patient; recording means of substantially hard and non-deformable material; means mounting said recording means on one of said supporting means; a pair of light-weight, air-driven turbines; means mounting said turbines in horizontally spaced relation upon the other of said supporting means; a rotary cutter driven by each of said air-turbines; and means for moving said rotary cutters progressively into said recording means while effecting relative lateral movement of the patient's jaws in all directions so as to cut a pair of three-dimensional pantographs of the relative jaw movements in said recording means.

17. Apparatus for cutting three-dimensional pantographs of the relative movements of a dental patient's jaws in relatively hard material comprising: supporting means mountable to the upper and lower jaws of the patient; recording means of substantially hard and non-deformable material; means mounting said recording means on one of said supporting means; a pair of light-weight, air-driven turbines; means mounting said turbines in horizontally spaced relation upon the other of said supporting means; a rotary cutter driven by each of said air-turbines; and means for moving said rotary cutters progressively into said recording means while effecting relative lateral movement of the patient's jaws in all directions so as to cut a pair of three-dimensional pantographs of the relative jaw movements in said recording means, said air-turbines, rotary cutters and recording means being supported solely by said supporting means which are in turn supported solely by the patient's jaws.

18. A dental jig for cutting analogs of a patient's temporomandibular joints comprising: a base; a pair of supports mounted adjacent the rear of said base; means mounting said supports for lateral movement transversely of said base into adjusted positions; means mounting said supports for vertical movement relatively to the base; rotary drive means mounted on said supports so as to be adjustable transversely and vertically therewith; means on said rotary drive means for interchangeably supporting pins and cutting tools therein; means for limiting the upward movement of said supports and rotary drive means to establish with a predetremined length of pin in the drive means the position of the simulated hinge axis of a patient's jaws; means for mounting analog blocks above said rotary drive means so that cutting tools therein will cut analog sockets in the blocks; and means for moving said analog blocks to simulate movements of a patient's temporomandibular joints while elevating said cutting tools to cut analog sockets in the blocks.

19. A dental jig for cutting analogs of a patient's temporomandibular joints comprising: a base; a pair of supports mounted adjacent the rear of said base; means mounting said supports for lateral movement transversely of the said base into adjusted positions; means mounting said supports for vertical movement relatively to the base; rotary drive means mounted on said supports so as to be adjustable transversely and vertically therewith; means on said rotary drive means for interchangeably supporting pins and cutting tools therein; means for limiting the upward movement of said supports and rotary drive means to establish with a predetermined length of pin in the drive means the position of the simulated hinge axis of a patient's jaws; means mounting one portion of a recording and tracer combination on said base; a movable frame coporating with said base; means mounting the other portion of said recording and tracer combination on said movable frame; and means mounting analog blocks on said movable frame above said rotary driving means, whereby relative movement between said recording and tracer combination and elevation of said rotary driving means and cutting tools therein will cut analog sockets in the blocks.

20. A dental jig for cutting analogs of a patient's temporomandibular joints comprising: a base; a pair of supports mounted adjacent the rear of said base; means mounting said supports for lateral movement transversely of said base into adjusted positions; means mounting said supports for vertical movement relatively to the base; rotary drive means mounted on said supports so as to be adjustable transversely and vertically therewith; means on said rotary drive means for interchangeably supporting pins and cutting tools therein; means for limiting the upward movement of said supports and rotary drive means to establish with a predetermined length of pin in the drive means the position of the simulated hinge axis of a patient's jaws; guide plates having border limit guide slots therein; analog blocks in which the joint analogs are to be cut; means mounting said analog blocks and guide plates together above said rotary drive means with the shanks of cutting tools therein passing through the guide slots; means for moving said analog blocks and guide plates to simulate the movements of the patient's temporomandibular joints and with their lateral movements limited by the engagement of the walls of the guide slots with the tool shanks; and means for elevating the supports and rotary drive means to cut analog sockets while the analog blocks are being so moved.

References Cited
UNITED STATES PATENTS

| | | | |
|---|---|---|---|
| 2,816,360 | 12/1957 | Stuart | 32—32 |
| 3,009,265 | 11/1961 | Bezark | 32—71 X |
| 3,100,344 | 8/1963 | Sharp | 32—67 |
| 3,206,852 | 9/1965 | Swanson | 32—32 |

RICHARD A. GAUDET, *Primary Examiner.*

ROBERT E. MORGAN, *Examiner.*

J. W. HINEY, *Assistant Examiner.*